July 24, 1962     H. A. RUDD, SR     3,045,930
AIR HOSE NOZZLE ATTACHMENT
Filed July 14, 1961
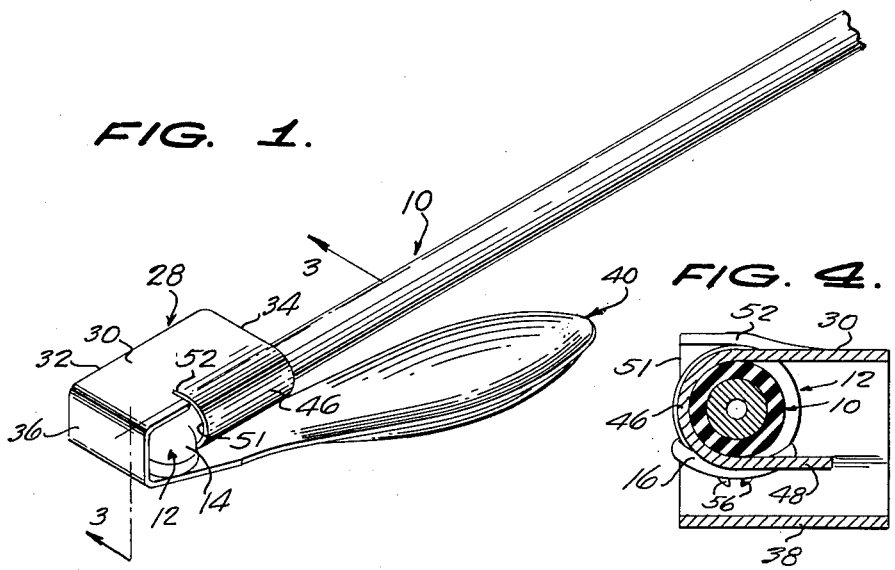
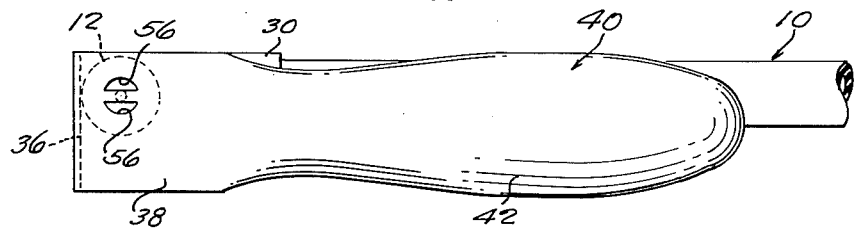
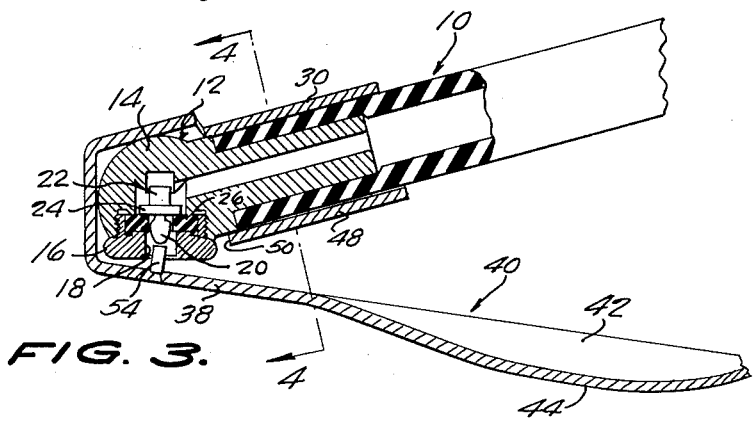
INVENTOR.
HILTON A. RUDD, SR.
BY
McMorrow, Berman & Davidson
ATTORNEYS.

United States Patent Office 3,045,930
Patented July 24, 1962

3,045,930
AIR HOSE NOZZLE ATTACHMENT
Hilton A. Rudd, Sr., 136 18th St., P.O. Box 33,
Fort Belvoir, Va.
Filed July 14, 1961, Ser. No. 124,032
1 Claim. (Cl. 239—579)

This invention relates to a novel nozzle attachment for air hoses, such as tire inflating hoses.

The primary object of the invention is the provision of a simple, low cost, efficient, and easily used device of the kind indicated, which is adapted to be easily and quickly applied to and removed from an air hose.

Another object of the invention is the provision of a device of the character indicated above which involves an air hose valve control lever which is spring-pressed away from the valve and extends inwardly along the side of the hose to which the valve opens, and has thereon means for controllably pushing the pin of the valve to partially and fully open positions, when the handle is compressed to varying degrees toward the hose, the lever having aperture means, facing the valve, which functions as nozzle means for air emerging from the valve, in an open position of the valve pin.

A further object of the invention is the provision of a device of the character indicated above, which embraces the head or body of an air hose valve and a portion of the hose adjacent thereto, and is designed to be applied to and removed therefrom simply by sliding the device sidewise onto and off the valve head and hose, the device having resilient valve head and hose engaging components.

A still further object of the invention is the provision of a device of the character indicated above which can be easily and economically made in one piece from suitable resilient and flexible material, such as sheet steel.

Other important objects and advantageous features of the invention will be apparent from the following description and the accompanying drawings, wherein, for purposes of illustration only, a specific form of the invention is set forth in detail.

In the drawings:

FIGURE 1 is a perspective view showing a device of the present invention applied to an air hose and its valve;

FIGURE 2 is a bottom plan view of FIGURE 1;

FIGURE 3 is an enlarged fragmentary longitudinal section taken on the line 3—3 of FIGURE 1, showing the valve pin in closed position and the handle of the device in relaxed position; and FIGURE 4 is a transverse section taken on the line 4—4 of FIGURE 3.

Referring in detail to the drawings, wherein like numerals designate like parts throughout the several views, the numeral 10 designates a flexible compressed air hose having a tire-inflating valve 12 secured in its outer or free end. The valve 12 is of conventional form and includes a hemispherical head 14 having a flat annular member 16, facing one side of the hose 10 at an angle, and having a central opening 18 which provides access to the tip 20 of a valve pin 22. The valve pin 22 has thereon a lateral annular valve collar 24, intermediate its ends, which is pressed outwardly against a compressible, annular valve seat 26, located within the head 14 and surrounding the pin 22, whereby the valve is closed by air pressure in the hose. The valve is opened to obtain discharge of air through the opening 18 by pressing the valve pin 22 inwardly, and the degree of inward displacement of the valve pin determines the rate and volume of air so discharged. The foregoing is conventional and forms no part of the present invention, except in combination therewith.

The illustrated nozzle attachment, generally designated 28, preferably made of resilient and flexible sheet material, comprises a flat rectangular upper plate 30 having a free longitudinal side edge 32, and a free transverse longitudinally inward edge 34. The plate 30 merges, at its longitudinally outward edge, into a longitudinally outwardly and downwardly angled flat connecting wall 36, which extends the width of the outward edge of the plate 30, but is preferably narrower than the axial depth of the valve head 14, as shown in FIGURE 3. The connecting wall 36 merges, at its lower transverse edge, into the flat longitudinally outward end portion 38 of a longitudinally elongated and longitudinally inwardly extending handle 40, which is angled laterally away from the hose 10. The handle 40 has an elongated hand-grip portion 42, longer than the outer end portion 38, which is dished to provide a transversely and longitudinally rounded convex underside 44, for comfortable contact with the fingers of a user grasping the hose 10 and the handle 40.

The upper plate 30 is formed along its side edge remote from its free longitudinal side edge 32, with a semi-circular connecting wall 46, preferably of the same curvature as the side of the hose, which merges, at its lower end, into a flat rectangular bottom plate 48. As shown in FIGURES 1 and 4, the bottom plate 48 is narrower and shorter than the top plate 30 and it and the connecting wall 46 are spaced longitudinally inwardly from the flat connecting wall 36, so as to provide a bottom opening 50 and a side opening 51, for the valve head 10. The top and bottom walls are tensioned toward each other gripping the hose 12, when engaged therebetween, whereby the device is securely but removably mounted on the hose, and is frictionally prevented from rotating, relative to the hose 10, from a set position. A short transverse slot 52, extends laterally inwardly from the side edge of the plate 30, at the longitudinally outward end of the semi-circular connecting wall 46, which gives the bottom plate 48 and the connecting wall 46 greater freedom to flex, relative to the top plate 30, in a spring jaw arrangement.

The outer end portion 38 of the handle 40 has fixed thereon an upstanding lug 54, smaller in cross section than and designed to be moved upwardly through the opening 18 of the valve member 16, the lug 54 being located on the handle 40 and the device being disposed on the hose 10, so that when the handle 40 is compressed upwardly toward the hose 10, the lug engages the top 22 of the valve pin 20 and pushes the valve pin to a partially or fully open position, at the option of the user.

The device has nozzle apertures in the outward end portion 38 of the handle, which are located around the lug 54, and can comprise opposed semi-circular openings 56, and which receive and channel air discharged from the valve opening 18, so as to provide an air jet which is confined to a predetermined cross section, by the size and shape of the openings 56, and one which can be directed, at will, as for air-cleaning limited areas of automobiles, such as floors, batteries, and other parts.

The device 28 is adapted to be applied simply by forcing the same sidewise over the hose 10 and the valve head 14, until the valve head is positoned in the openings 50 and 51, and the hose engages the semi-circular connecting wall 46, as shown in FIGURES 1 and 4. Removal of the device involves merely pushing or pulling the same sidewise off the hose and the valve head.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

An air hose nozzle control attachment for use with an air hose having a valve, the valve including a projecting head portion, a valve pin seated in the head portion for reciprocating motion from a depressed open location to a normal closed location, arranged to discharge the valve in a path disposed at a fixed, obtuse angle in relation to the hose, the attachment comprising:

(a) a top plate overlying the head portion and an adjacent portion of the air hose, the top plate including an outer end edge and an inner end portion;

(b) a connecting wall secured at one end to the outer end edge of the top plate at an angle substantially that of the angle of discharge of the valve;

(c) an elongated handle secured to the other end of the connecting wall and extending therefrom in the direction of the hose and having a flat forward portion at least covering the valve head and a rear hand-grip portion adapted for clamping against the hose;

(d) clamp means projecting laterally from the inner end portion of the top plate and fitting about the hose to secure the attachment thereto;

(e) the clamp means including a semi-circular connecting wall and a bottom plate biased against the hose;

(f) an imperforate, fixed lug on the handle projecting inwardly and aligned to contact the valve pin to depress same to its open location; and (g) the handle having an air passage, including a pair of semi-circular openings arranged on opposite sides of the lug, whereby upon movement of the handle in the direction of the valve head, the lug depresses the valve pin and the discharge path of the air hose is directed through said air passage.

References Cited in the file of this patent
UNITED STATES PATENTS

| | | |
|---|---|---|
| 1,557,994 | Dyson et al. | Oct. 20, 1925 |
| 2,229,213 | Kubiliunas | Jan. 21, 1941 |
| 2,579,408 | Vreeland | Dec. 18, 1951 |
| 2,587,040 | Green | Feb. 25, 1952 |
| 2,685,989 | Samuels | Aug. 10, 1954 |